Figure 1:
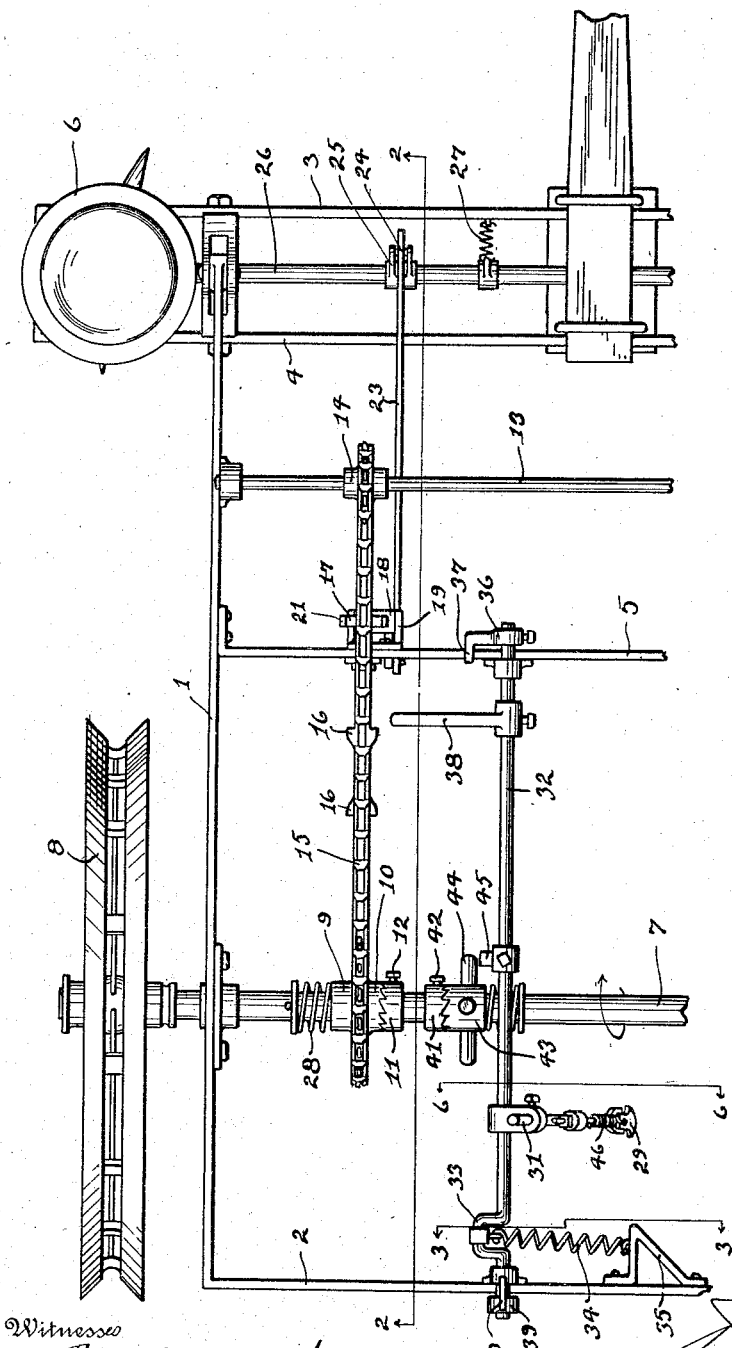

J. E. TAYLOR.
PLANTER.
APPLICATION FILED SEPT. 30, 1916.

1,227,018.

Patented May 22, 1917.
3 SHEETS—SHEET 1.

J. E. TAYLOR.
PLANTER.
APPLICATION FILED SEPT. 30, 1916.
1,227,018.
Patented May 22, 1917.
3 SHEETS—SHEET 2.
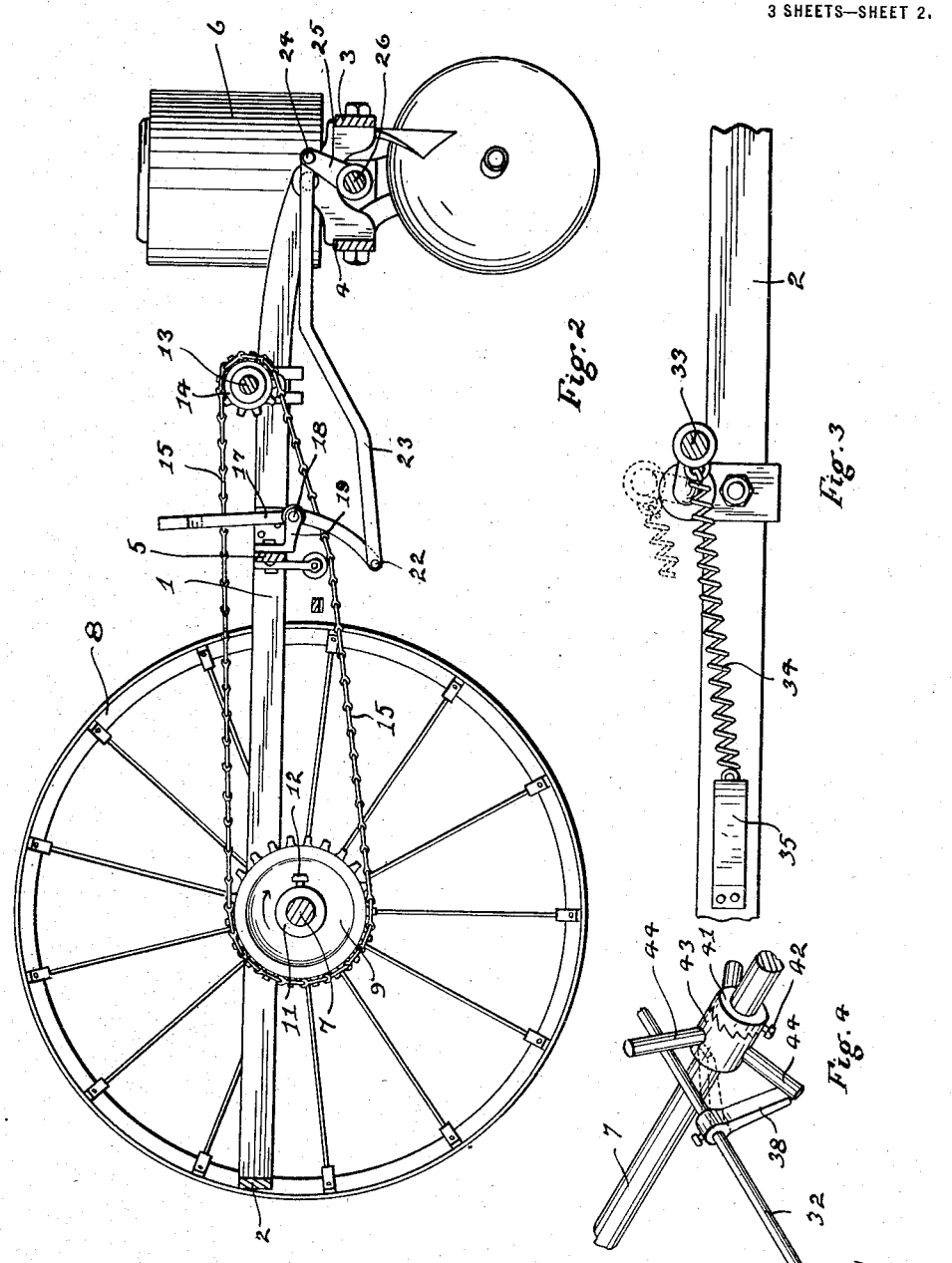

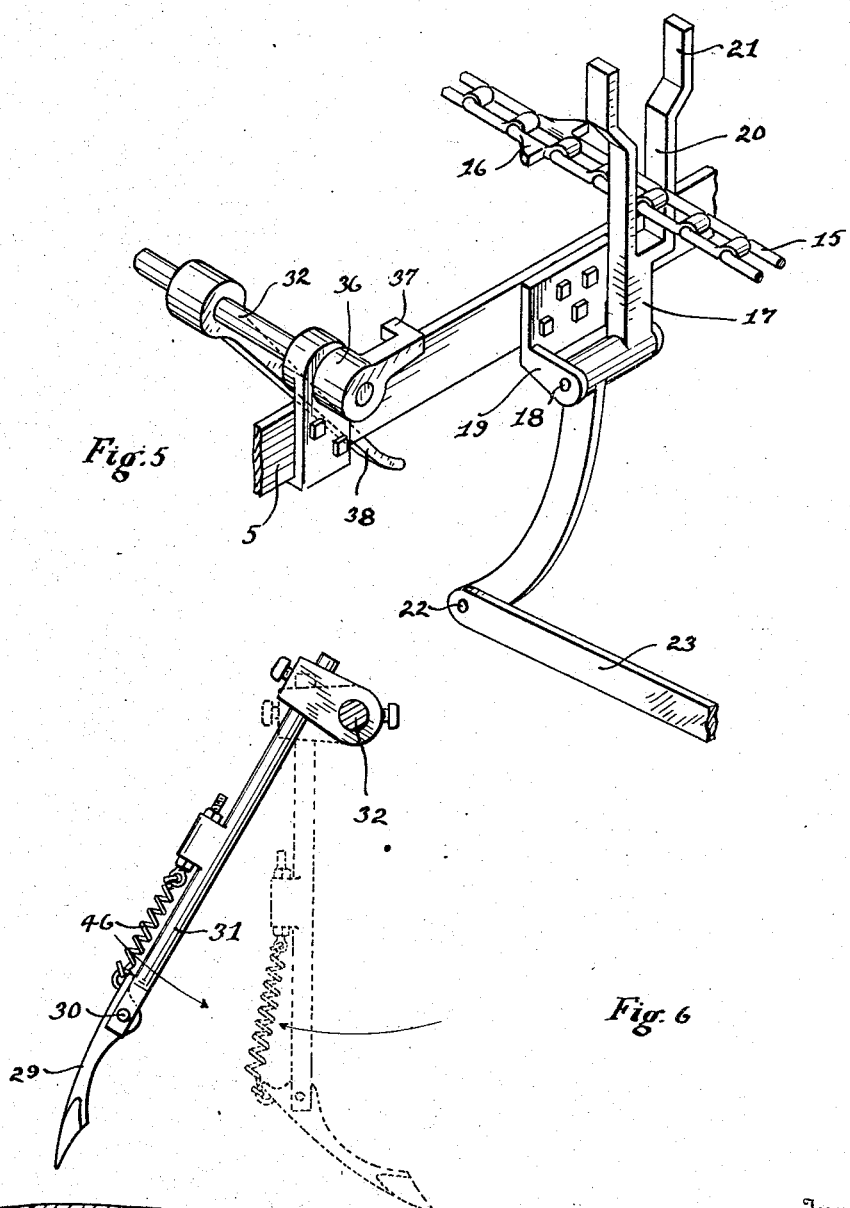

UNITED STATES PATENT OFFICE.

JOHN E. TAYLOR, OF CAMDEN, OHIO, ASSIGNOR OF ONE-HALF TO J. F. KNEPPER, OF WHITEWATER, INDIANA.

PLANTER.

1,227,018.      Specification of Letters Patent.      Patented May 22, 1917.

Application filed September 30, 1916. Serial No. 123,152.

*To all whom it may concern:*

Be it known that I, JOHN E. TAYLOR, a citizen of the United States, residing at Camden, in the county of Preble and State of Ohio, have invented certain new and useful Improvements in Planters, of which the following is a specification.

This invention relates to planters and particularly corn planters, wherein the grain is planted in rows alining both longitudinally and transversely throughout the field. More specifically, my invention relates to a checker operating mechanism for so planting the grain.

The main object of my invention resides in a structure whereby this checker mechanism is periodically operated by the movement of the vehicle, the periodic checker operations being in a known relation with the linear travel of the wheels of the planter. In other words, my invention dispenses entirely with the wire structure now generally in use and which spans the entire field and must be moved from time to time as each succeeding row is planted.

A further object of my invention resides in a novel type of check marker whereby the operator of the planter may at all times have a visual indication as to the alinement of transverse rows during the planting operation.

Still a further object of my invention resides in means whereby either or both the checker operating structure or the check marker may be adjusted or re-set to vary certain spacing to make all spacings in the field aline. This arrangement is necessary to compensate for the unevenness or undulating nature of the ground being planted, since the distance of linear travel will naturally be less on the level portion of the field than it would be on the hilly or undulating portion.

The preferred embodiment of my invention is shown in the accompanying sheets of drawings, in which similar characters of reference designate corresponding parts, and in which:

Figure 1 is somewhat of a skeleton view taken in plan of a portion of a corn planter showing my invention applied, Fig. 2 is a longitudinal section taken on line 2—2 of Fig. 1, Fig. 3 is a section taken on line 3—3 of Fig. 1, Fig. 4 is a fragmentary view in perspective of the means for causing the return of the check marker, Fig. 5 is a fragmentary view in perspective of the checker operating mechanism, and, Fig. 6 is a section taken on line 6—6 of Fig. 1.

In these drawings, the main framework of the planter has been shown somewhat diagrammatically and comprises side pieces 1, a rear transverse piece 2, front transverse pieces 3 and 4 and an intermediate transverse frame piece 5. To this framework, the hopper shown at 6 is securely mounted, it being understood, that this hopper is of the ordinary construction and that the mechanism contained within the same is such as will permit the periodic dropping of the seed when the same is properly operated. To the rear portion of the framework there is rotatably supported the axle 7 and upon this axle the wheels 8 are rigidly secured. It is by means of the rotation of this axle that both the feeding mechanism for the hopper 6 and the check marker to be presently described, are operated. On this shaft, there is loosely mounted a sprocket wheel 9, whose hub 10 is provided with a series of ratchet teeth to coöperate with a ratchet faced collar 11, this latter being set screwed to the shaft as shown at 12, whereby a rigid connection between the shaft 7 and sprocket 9 is established. A transverse shaft 13 is mounted on the general framework as is shown and on this shaft there is mounted an idle sprocket 14 over which and the sprocket 9, the chain 15 passes. This chain is of known length, which length is of known proportion with the circumference of the supporting wheel 8 and likewise, links having laterally projecting wings 16 are mounted in this chain in known relation. These links 16 are designed to coöperate with a trip lever 17 pivotally mounted to the transverse frame piece 5 as shown at 18 by means of the bracket member 19. The upper end of this trip lever is bifurcated as shown at 20 and the extreme outer ends 21 of these bifurcations are spaced slightly farther apart than the remainder of the bifurcation. The lower end of this lever is pivotally connected at 22 to an operating rod 23 which latter is in turn pivotally connected at 24 to the lever 25 rigidly secured to a rock shaft 26 which latter forms a portion of the feed or checker mechanism for the hopper 6, an oscillation of which causes the checker mechanism to operate. Thus, as the vehicle passes over the ground, the wings 16 of the chain links come into contact with the arms 21 of the lever 17 and cause the same to be tripped, thus pulling the operating rod 23 rearwardly and causing the rock shaft 26 to be oscillated. After the winged links 16 have passed beyond the upper end of the lever 17, the shaft 26 and the mechanism connected therewith are returned to their normal position by means of the spring shown at 27. The extreme portions 21 of the bifurcated end of the lever 17 are spaced apart a distance sufficient to insure the lever 17 returning in such manner that it will span the chain 15 after the manner shown particularly in Fig. 5.

Should the checker mechanism become out of line because of unevenness of the ground, the same may be readjusted by sliding the sprocket 9 laterally on its shaft 7 against the tension of the spring 28 and after the teeth of the ratchet faces have been brought out of engagement, this sprocket may be shifted in a forward or rearward direction, the required distance, as will be necessary to bring the rows in transverse alinement.

In order to give the operator of the vehicle a visual indication of the spacing of the grain, I have provided a check marker which takes the form of a foot 29 pivotally mounted at 30 on the lower end of the foot rod 31. This check marker is rigidly mounted upon a shaft 32 running longitudinally of the machine and which shaft is provided with a crank portion shown at 33. To this crank portion, there is attached one end of a coil spring 34, the opposite end being attached to a bracket 35 rigidly secured to the framework. The normal position of this shaft and crank, is shown in full lines in Fig. 3 and the spring is prevented from turning this shaft farther because of the dog 36 rigidly secured to the forward end of the shaft and which dog is provided with a lateral projection 37 which engages the top side of the transverse frame piece 5. Each time the checker mechanism is operated, the trip lever 17 is moved rearwardly as has been described and in such rearward movement, it engages the arm 38 also rigidly mounted on the shaft 32. This engagement between the trip lever 17 and arm 38 is sufficient to rotate the shaft 32 in such manner that the crank 33 is moved upwardly slightly beyond dead center position, whereupon the spring 34 comes into play to complete its movement and thereby repeatedly move the marker foot 29 through the ground in a direction transversely to the direction of movement of the vehicle. It is necessary to move this crank only through a distance of approximately 90 degrees and in order to limit such movement, I have provided a second dog 39 which is similar in construction to the dog 36, the only difference being that these two dogs are set at a 90 degree angle to each other so that the lateral projection 40 of the latter dog engages the top side of the rear frame piece 2 to limit the turn of the shaft 32 under the influence of the spring 34. To return the check marker to its normal position, I have provided the axle 7 with a second ratchet faced collar 41, this latter being held in position by means of the set screw 42. This ratchet faced collar coöperates with a ratchet faced star wheel 43, the arms 44 of which are of such size and shape to engage the arm 45 also rigidly mounted on the shaft 42. By reference to Fig. 4, the dotted line position of this arm 45 represents its position after the check marker has been operated. Further turning of the axle 7 then brings one of the arms 44 of the star wheel 43 into engagement with the same to cause the retraction of the shaft 32 beyond its dead center position and back to the position shown in full lines in Fig. 3. This returns the check marker which, because of its pivotal connection 30 passes over the top of the ground instead of scoring the same. The foot 29 is controlled by means of a coil spring 46 so that after the return movement of the check marker, this foot will again assume the position shown in full lines in Fig. 6. The ratchet arrangement between the collar 41 and the star wheel 43 is the same as that between the collar 11 and the sprocket 9, so that when the sprocket is adjusted to compensate for unevenness in the field, the star wheel 43 is correspondingly adjusted so that the score marks occur each time that the checker mechanism is operated. By means of this check marker structure, the operator may at all times have a visual indication of the proper alinement of transverse rows of corn as it is being planted.

What I claim, is:

1. In a planter, a framework, wheels supporting said framework, a seed feeder, a structure rotatable with said wheels, an idle sprocket, a chain passing over said sprockets, a trip lever pivoted to the framework, an operative connection between said lever and said feeder, means carried by the chain for periodically tripping said lever, a marker, an arm for operating said marker, said arm being located in the path of movement of said trip lever to operate said marker in one direction, and means for returning said marker after each scoring action.

2. In a planter, a framework, wheels supporting said framework, a seed feeder, a sprocket rotatable with said wheels, an idle sprocket, a chain passing over said sprockets, a trip lever pivoted to the framework, an operative connection between said lever and said feeder, means carried by said chain for periodically tripping said lever, a marker, a shaft upon which said marker is mounted, and means carried by said shaft and lying in the path of movement of said lever whereby said marker is actuated each time said lever is tripped, and means for returning said shaft to normal position.

3. In a planter, a framework, wheels supporting said framework, a seed feeder, a sprocket rotatable with said wheels, an idle sprocket, a chain passing over said sprockets, a trip lever pivoted to the framework, an operative connection between said lever and said feeder, means carried by said chain for periodically tripping said lever, a shaft extending longitudinally of the planter, an arm carried by said shaft, a marker on said shaft, said arm being located in the path of movement of said trip lever when the same is operated to cause said shaft to be oscillated to bring said marker into scoring engagement with the ground, and means for returning said shaft to its normal position after each marking action.

4. In a planter, a framework, wheels supporting said framework, a seed feeder, a sprocket rotatable with said wheels, an idle sprocket, a chain passing over said sprockets, a trip lever pivoted to the framework, an operative connection between said lever and said feeder, means carried by said chain for periodically tripping said lever, a shaft extending longitudinally of the planter, an arm carried by said shaft, a marker on said shaft, said arm being located in the path of movement of said trip lever when the same is operated by said chain to cause said shaft to oscillate to bring said marker into scoring engagement with the ground, a second lever on said shaft, and a star wheel operated by the movement of said supporting wheels to return said longitudinal shaft to normal position after each marking action.

In testimony whereof I affix my signature in presence of two witnesses.

JOHN E. TAYLOR.

Witnesses:
RALPH M. TAYLOR,
M. A. BARNET.

Copies of this patent may be obtained for five cents each, by addressing the "Commissioner of Patents, Washington, D. C."